United States Patent
Cantwell

(12) 
(10) Patent No.: US 7,051,095 B1
(45) Date of Patent: May 23, 2006

(54) LOCATING DEVICE RESOURCES ON A GLOBAL SCALE

(75) Inventor: Charles E. Cantwell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 09/652,611

(22) Filed: Aug. 30, 2000

(51) Int. Cl.
*G06F 15/16* (2006.01)
*G06G 7/78* (2006.01)

(52) U.S. Cl. ......................... 709/223; 701/300

(58) Field of Classification Search ............... 709/202, 709/226, 224, 201, 205, 223; 710/8, 15; 701/200, 300
See application file for complete search history.

(56) References Cited

U.S. PATENT DOCUMENTS

| | | | | |
|---|---|---|---|---|
| 4,914,571 A | * | 4/1990 | Baratz et al. ................. | 707/10 |
| 5,666,557 A | * | 9/1997 | Cassidy et al. ................ | 710/8 |
| 5,699,495 A | * | 12/1997 | Snipp ........................ | 358/1.15 |
| 6,101,559 A | * | 8/2000 | Schultz et al. ................ | 710/15 |
| 6,295,502 B1 | * | 9/2001 | Hancock et al. ............. | 701/201 |
| 6,453,350 B1 | * | 9/2002 | Factor ........................ | 709/226 |
| 6,591,297 B1 | * | 7/2003 | Challener et al. ........... | 709/224 |
| 2001/0023440 A1 | * | 9/2001 | Franklin et al. ............. | 709/226 |

FOREIGN PATENT DOCUMENTS

JP 11346216 12/1999

* cited by examiner

*Primary Examiner*—Paul H. Kang

(57) ABSTRACT

A physical location is learned for a resource communicating with a network. A global resource locator (GRL) tag is assigned to the resource. The GRL tag includes at least a description of the physical location of the resource. The GRL tag is communicated over the network. A client receives the GRL tag and extracts the description of the location of the resource. The GRL tag may include a coordinate system and coordinates for the resource identifying the location of the resource. The GRL tag may also include a descriptive label of the resource. The GRL tag is either stored on the resource or in a list of resources on a server. GRL tags may be searched by applying user selected search criteria to the GRL tag. An example of user selected search criteria is a comparison of the location of the user to the location of the resource.

16 Claims, 2 Drawing Sheets

US 7,051,095 B1

LOCATING DEVICE RESOURCES ON A GLOBAL SCALE

FIELD OF THE INVENTION

This invention relates in general to devices communicating with a network and, more particularly, to discovering a physical location of devices communicating with a network.

BACKGROUND OF THE INVENTION

Today, network resources are abundant. Network resources are those resources that communicate with a network. A network is any combination of two or more resources in communication, such as in an intranet or the Internet. Examples of network resources include printers, scanners, copiers, multifunction devices, printing centers, and copying centers.

Most network resources provide services to users of the network with which they communicate. For example, printers communicating with an intranet provide printing services to users of the intranet. A user desiring to print a document may select one of the printers communicating with the intranet in order to print the document.

Often users are familiar with a small set of resources. The user knows how to access those resources and, if necessary, where those resources are located. In some instances, it is desirable for a user to access resources with which the user is unfamiliar. Either the user does not know how to access the resource, the user does not know the physical location of the resource, or the user neither knows how to access the resource nor its physical location. The user may not even be aware that the resource exists, but desires to find a resource to meet the users needs. For example, a first user may desire to print a document to a printer in close proximity to a second user where the second user is a great distance away from the first user. The first user must somehow locate a printer near to the second user.

Conventionally, there is no simple or uniform method for discovering information about an unfamiliar resource. In some instances, web pages may detail the location, address, and capabilities of resources on a network. In other instances, the user desiring to learn about a resource must find someone to ask about the available resources.

SUMMARY OF THE INVENTION

According to principles of the present invention, a physical location is learned for a resource communicating with a network. A global resource locator (GRL) tag is assigned to the resource. The GRL tag includes at least a description of the physical location of the resource. The GRL tag is communicated over the network. A client receives the GRL tag and extracts the description of the location of the resource.

According to further principles of the present invention, the GRL tag may include a coordinate system and coordinates for the resource identifying the location of the resource. The GRL tag may also include a descriptive label of the resource. The GRL tag is either stored on the resource or in a list of resources on a server.

According to further principles of the present invention, the GRL tags may be searched by applying user selected search criteria to the GRL tag. An example of user selected search criteria is a comparison of the location of the user to the location of the resource.

DETAILED DESCRIPTION OF THE INVENTION

Figure 1:
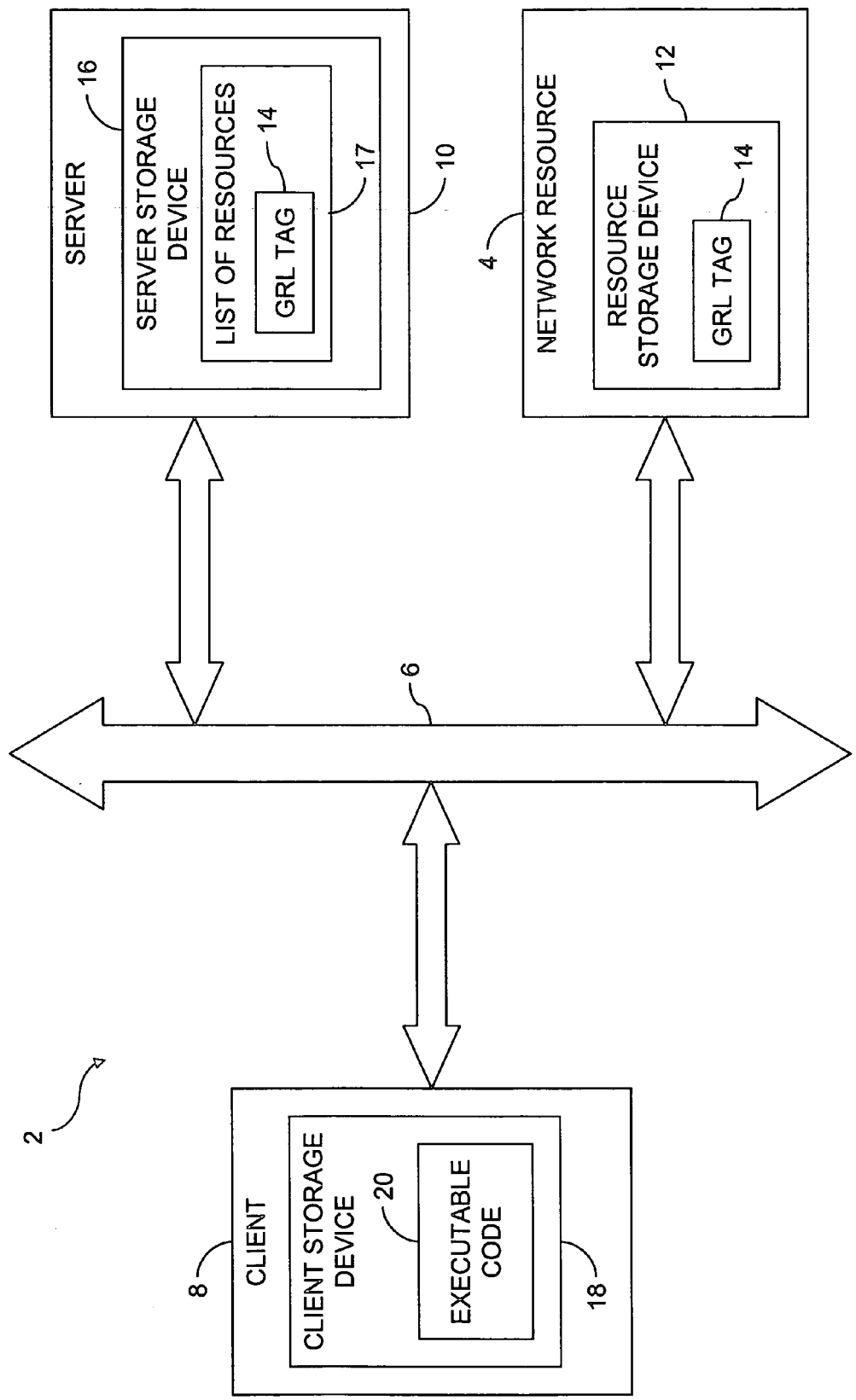
FIG. 1 is a block diagram representing one embodiment of the system of the present invention for learning the physical location of a resource in communication with a network.

Illustrated in FIG. 1 is a system 2 including a network resource 4, a network 6, and a client 8. System 2 may include additional network resources 4 and clients 8. For clarity, only one of each is shown and will be discussed. In the depicted embodiment, system 2 also includes a server 10. As described below, server 10 is not always necessary for the operation of system 2. System 2 may also be more than one server 10.

Network 6 is any communication system for providing communication between at least network resource 4 and client 8. If server 10 is required, network 6 must also provide communication between server 10 and client 8. Examples of network 6 include an intranet or the internet.

Network resource 4 is any resource such as a device or a site at which a service is performed. Examples of network resources 4 include printers, scanners, copiers, multifunction devices, printing centers, and copying centers.

Some network resources 4 include a resource storage device 12. Resource storage device 12 is any device for storing data. Resource storage device 12 may be any type of storage media such as magnetic, optical, or electronic storage. A global resource locator (GRL) tag 14 is stored in resource storage device 12.

Other network resources 4 do not include a resource storage device 12. Where not all resources 4 include a resource storage device 12, server 10 is required. Server 10 includes a server storage device 16 for storing a list of resources 17 and GRL tags 14. Server storage device 16 is any device for storing data. Server storage device 16 may be any type of storage media such as magnetic, optical, or electronic storage.

GRL tag 14 is a string that includes at least a description of the physical location of resource 4. Preferably, GRL tag 14 may take any form so long as the form is uniform throughout network 6. It is desirable that GRL tag 14 be small as it may reside on resource storage device 12 where storage space is often limited. In one embodiment, GRL tag 14 takes the form {{GRL}}[sys]xxx[coord]yyy[label]zzz where {{GRL}} is a prefix, xxx is a coordinate system, yyy is the coordinate, and zzz is a label. It is desirable that the prefix {{GRL}} always be the first string in the GRL tag. Placing the prefix first in the tag allows for quick differentiation between GRL tags and other types of tags, such as uniform resource locator (url) tags.

An elevation may be included in coordinate yyy. The actual value of the coordinate yyy depends on which coordinate system xxx is used. Examples of coordinate system xxx include standard NAD-27 and WGS-84 systems. Other coordinate systems are alternatively used so long as a uniform coordinate system is used throughout network 6. Alternatively, multiple coordinate systems xxx may be used throughout network 6 provided that each coordinate system xxx may be converted to each other coordinate system xxx.

Label zzz allows additional information about resource 4 to be included in GRL tag 14. In one embodiment, label zzz takes the form <type> <desc> <bldg><flr> <pos> <addr> <usr> where <type> is the type of resource 4, <desc> is a description of resource 4, <bldg> is a building where resource 4 resides, <flr> is a floor upon which resource 4 resides, <pos> is a position of resource 4 within a structure, <addr> is an address of resource 4, and <usr> is additional user information concerning resource 4. The type of resource 4 may be in general terms, such as printer, scanner, copier, print center, or copy center. The description should be short and useful. The building, floor, position, and address should provide enough information so that a user can pinpoint resource 4 as closely as necessary. The user information may include such information as notes, instructions, or capabilities of resource 4. Not all of the parts of label zzz will be useful for every resource 4. The parts of label 14 that are not used may be omitted.

Client 8 is any client computer used by a user for learning the physical location of resource 4. Client 8 includes a program storage device 18 upon which executable code 20 resides. When executed on client 8, executable code 20 carries out method steps for allowing a user to learn the physical location of resource 4.

Client storage device 18 is any device for storing executable code 20. Client storage device 18 may be any type of storage media such as magnetic, optical, or electronic storage. Other in formation, data, or executable code may also be stored on client storage device 18.

Figure 2:
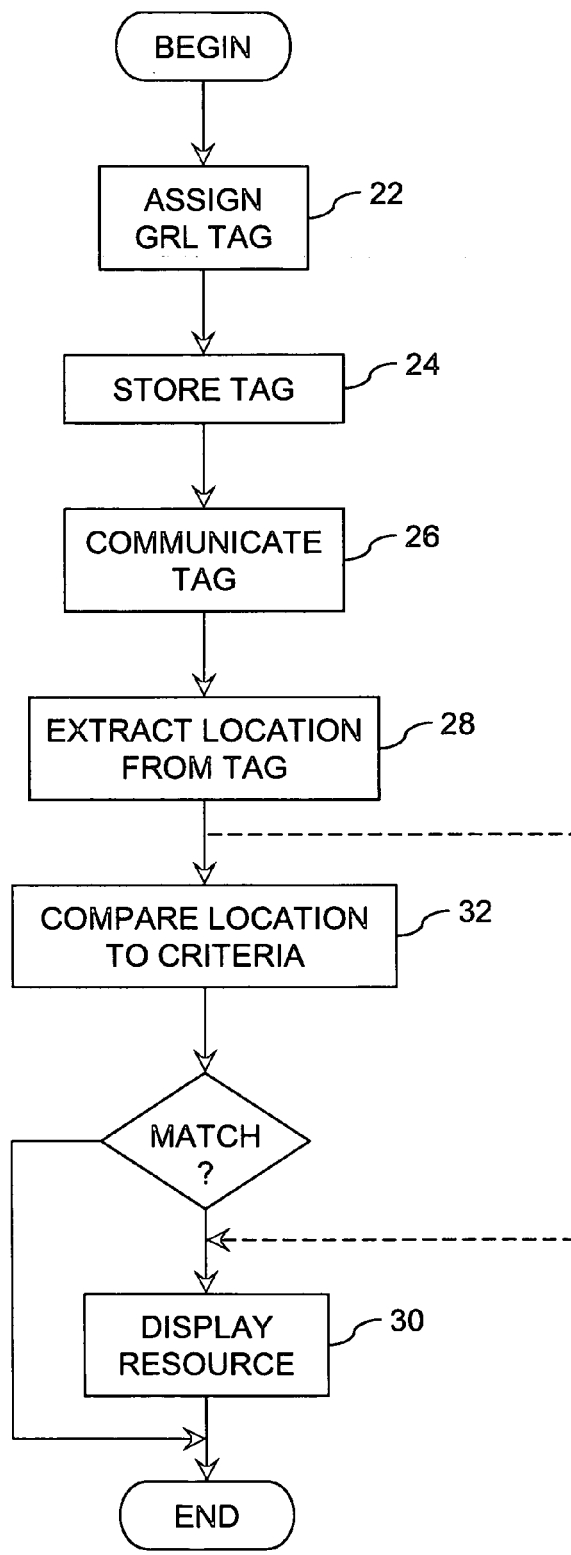
FIG. 2 is a flow chart illustrating one embodiment of the method of the present invention for learning the physical location of a resource in communication with a network.

Illustrated in FIG. 2 are steps for practicing one embodiment of the method of the present invention. GRL tag 14 is assigned 22 to network resource 4. GRL tag 14 is assigned 22 to network resource 4 by a tag assignor (not shown), The tag assignor is any device or system capable of communicating with network resource 4 or location server 10 to assign GRL tag 14 to network resource 4. GRL tag 14 is stored 24 in a location accessible by network 6 either in network resource 4 or server 10. GRL tag 14 is communicated 26 over network 6 to client 8. GRL tag 14 may be communicated in either in response to a request or query from client 8 or unsolicited.

Client 8 receives GRL tag 14 and extracts 28 the description of the location of resource 4 from GRL tag 14. Client 8 alternatively presents 30 the resource to a user of client 8 or first compares 32 the location of the resource 4 to user selected criteria. The user selected criteria includes criteria concerning location and, optionally, other information conveyed by GRL tag 14, such as the type of resource 4, description of resource 4, or capabilities of resource 4.

If the location of resource 4 does not meet the user selected criteria, resource 4 is not presented 30 to the user. Otherwise, resource 4 is presented to the user. Resource 4 may be presented 30 to the user by either displaying GRL tag 14 to the user or first extracting information from GRL tag 14 and presenting 30 the extracted information to the user in a more easily understandable form.

The foregoing description is only illustrative of the invention. Various alternatives and modifications can be devised by those skilled in the art without departing from the invention. Accordingly, the present invention embraces all such alternatives, modifications, and variances that fall within the scope of the appended claims.

What is claimed is:

1. A method for learning the physical location of a resource in communication with a network, the method comprising:
    (a) assigning to the resource a global resource locator (GRL) tag, the GRL tag including at least a description of the physical location of the resource, the description of the physical location including coordinates for the resource and at least one character, separate from the coordinates, indicating a coordinate system;
    (b) communicating the GRL tag over the network; and,
    (c) extracting the description of the physical location from the GRL tag.

2. The method of claim 1 wherein assigning the GRL tag includes storing the GRL tag on the resource.

3. The method of claim 1 wherein assigning the GRL tag includes storing the GRL tag in a list of resources on a server.

4. The method of claim 1 wherein assigning the GRL tag includes providing a descriptive label of the resource in the GRL tag.

5. The method of claim 1 further including applying user selected search criteria to the GRL tag.

6. The method of claim 5 wherein the user selected search criteria includes a comparison of a location of the user to the location of the resource.

7. A system for learning the physical location of a resource in communication with a network, the system comprising:
    (a) a network resource;
    (b) a client device;
    (c) a network for providing communication between the network resource and the client device;
    (d) a tag assignor configured to assign to the resource a global resource locator (GRL) tag, the GRL tag including at least a description of the physical location of the resource, the description of the physical location including coordinates for the resource and at least one character, separate from the coordinates, indicating a coordinate system; and,
    (e) executable code, accessible by the client, configured to extract the description of the physical location from the GRL tag for the client.

8. The system of claim 7 wherein the tag assignor includes means for storing the GRL tag on the resource.

9. The system of claim 7 wherein the tag assignor includes:
    (a) a server;
    (b) a list of resources stored on the server; and,
    (c) means for storing the GRL tag in the list of resources.

10. The system of claim 7 wherein the tag assignor includes means for providing a descriptive label of the resource in the GRL tag.

11. The system of claim 7 wherein the executable code is further configured to apply user selected search criteria to the GRL tag.

12. The system of claim 11 wherein the user selected search criteria includes a comparison of a location of the user to the location of the resource.

13. A program storage device readable by a computer, tangibly embodying a program, applet, or instructions executable by the computer to perform method steps for learning the physical location of a resource in communication with a network, the method steps comprising:

(a) receiving a GRL tag communicated over the network, the GRL tag including at least a description of the physical location of the resource, the description of the physical location including coordinates for the resource and at least one character, separate from the coordinates, indicating a coordinate system; and, (b) extracting the description of the physical location from the GRL tag.

14. The program storage device of claim 13 wherein the method steps further include applying user selected search criteria to the GRL tag.

15. The program storage device of claim 14 wherein the user selected search criteria includes a comparison of a location of the user to the location of the resource.

16. The program storage device of claim 14 wherein method steps further include displaying to the user resource meeting the user selected search criteria.

* * * * *